United States Patent
Okada et al.

(10) Patent No.: US 10,715,363 B1
(45) Date of Patent: Jul. 14, 2020

(54) OPTICAL COMMUNICATION APPARATUS, SERVER APPARATUS, AND OPTICAL TRANSPORT SYSTEM

(71) Applicant: FUJITSU LIMITED, Kawasaki-shi, Kanagawa (JP)

(72) Inventors: Naoya Okada, Yokohama (JP); Taizo Maeda, Kawasaki (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/558,827

(22) Filed: Sep. 3, 2019

(30) Foreign Application Priority Data

Feb. 22, 2019 (JP) .................................. 2019-030833

(51) Int. Cl.
  *H04L 27/00* (2006.01)
  *H04L 1/00* (2006.01)
  *H04L 5/00* (2006.01)

(52) U.S. Cl.
  CPC ........ *H04L 27/0008* (2013.01); *H04L 1/0003* (2013.01); *H04L 1/003* (2013.01); *H04L 1/0009* (2013.01); *H04L 1/0033* (2013.01); *H04L 1/0036* (2013.01); *H04L 5/0092* (2013.01)

(58) Field of Classification Search
  CPC . H04L 27/0008; H04L 1/0003; H04L 1/0009; H04L 1/003; H04L 1/0033; H04L 1/0036; H04L 5/0092
  See application file for complete search history.

(56) References Cited

U.S. PATENT DOCUMENTS

| | | | |
|---|---|---|---|
| 10,320,486 B1* | 6/2019 | Kojima | H04L 27/36 |
| 2006/0088056 A1* | 4/2006 | Quigley | H04L 1/0003 |
| | | | 370/468 |
| 2009/0041100 A1* | 2/2009 | Kimmich | H04N 19/61 |
| | | | 375/220 |
| 2015/0333860 A1* | 11/2015 | Rahn | H04L 27/0008 |
| | | | 398/34 |

(Continued)

FOREIGN PATENT DOCUMENTS

| | | |
|---|---|---|
| EP | 3 248 292 B1 | 2/2019 |
| JP | 2017-513347 | 5/2017 |
| JP | 2017-533639 | 11/2017 |

OTHER PUBLICATIONS

Technology Options for 400G Implementation OIF-Tech-Options-400G-01.0 Jul. 2015 (Year: 2015).*

(Continued)

*Primary Examiner* — Chi H Pham
*Assistant Examiner* — Weibin Huang
(74) *Attorney, Agent, or Firm* — Staas & Halsey LLP

(57) ABSTRACT

An optical communication apparatus has an interface circuit that acquires transfer condition information including a bit rate and a channel spacing of an optical network, a processor that selects a modulation scheme in accordance with the transfer condition information and operates in the modulation scheme, wherein the processor is configured to select a first modulation scheme when the bit rate is greater than a first value in accordance with the channel spacing, and select a second modulation scheme when the bit rate is smaller than the first value, the second modulation scheme having a data transfer performance higher than the first modulation scheme.

14 Claims, 18 Drawing Sheets

(56) References Cited

U.S. PATENT DOCUMENTS

| | | | |
|---|---|---|---|
| 2016/0050470 A1* | 2/2016 | Swinkels | H04Q 11/0062 |
| | | | 398/45 |
| 2016/0233979 A1* | 8/2016 | Koike-Akino | H03M 13/1111 |
| 2016/0261368 A1* | 9/2016 | Maeda | H04B 10/07957 |
| 2017/0048134 A1* | 2/2017 | Bruno | H04L 45/302 |
| 2017/0331580 A1* | 11/2017 | Shen | H04J 14/0227 |
| 2017/0338890 A1* | 11/2017 | Takeshita | H04B 10/27 |

OTHER PUBLICATIONS

Nonlinearity-tolerant Modulation Formats for Coherent Optical Communications TR2017-197 Dec. 2017 Kojima, K.; Koike-Akino, T.; Yoshida, T.; Millar, D.S.; Parsons, K. (Year: 2017).*

Keisuke Kojima et al., "5 and 7 bit/symbol 4D Modulation Formats Based on 2A8PSK", Proceedings European Conference on Optical Communication (ECOC) 2016-42$^{nd}$, Sep. 18, 2016, 4 pgs.

WIPO English abstract for International Patent Publication No. WO 2016/129393 A2 corresponding to Japanese Patent Publication No. 2017-533639, published Nov. 9, 2017.

WIPO English abstract for International Patent Publication No. WO 2016/002549 A1 corresponding to Japanese Patent Publication No. 2017-513347, published May 25, 2017.

* cited by examiner

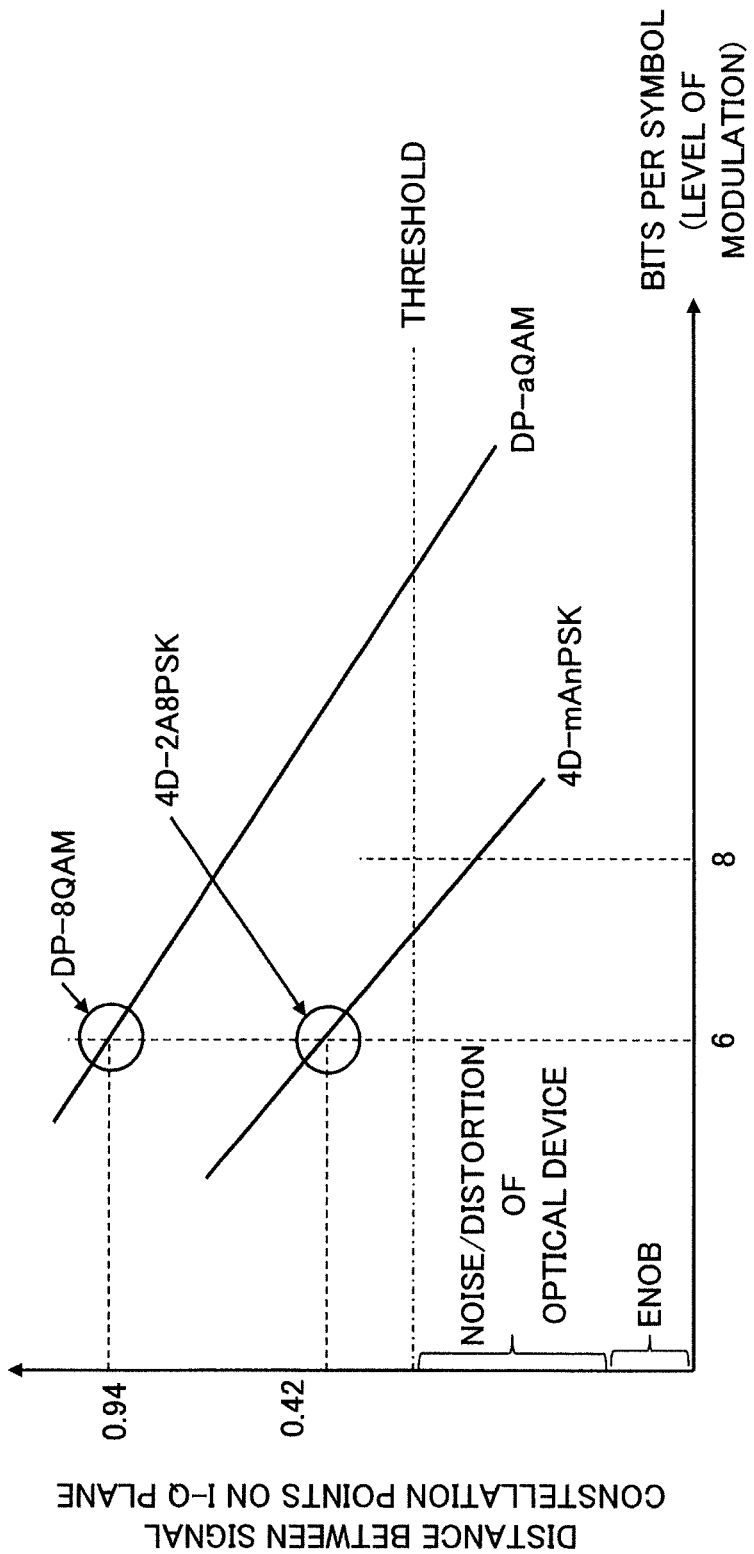

4D-2A8PSK

⟷ THE MINIMUM DISTANCE BETWEEN TWO SIGNAL CONSTELLATIONS

⟵--⟶ REFERENCE DISTANCE

| CHANNEL SPACING (GHz) | BIT RATE (Gbps) | MODULATION SCHEME | BAUD RATE (Gbaud) | THRESHOLD INFORMATION |
|---|---|---|---|---|
| 75 | 200 | 4D-2A8PSK | ave. 60 | 300 Gbps |
| | 300 | 4D-2A8PSK +16QAM | | |
| | 400 | DP-16QAM | | |
| | 500 | DP-32QAM | | |
| | 600 | DP-64QAM | | |
| 50 | 150 | 4D-2A8PSK | ave. 40 | 160 Gbps |
| | 200 | DP-16QAM | | |
| | 300 | DP-64QAM | | |

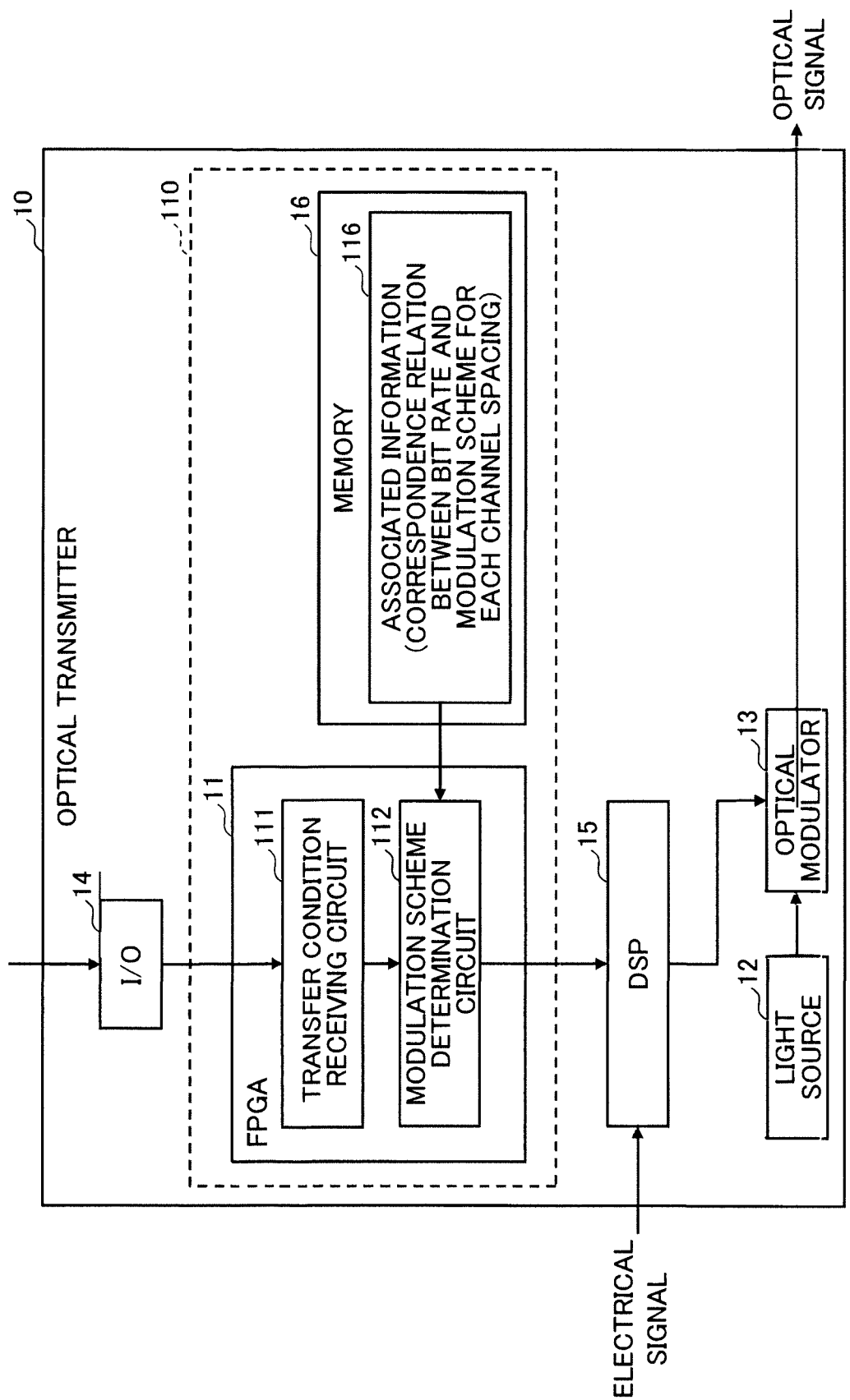

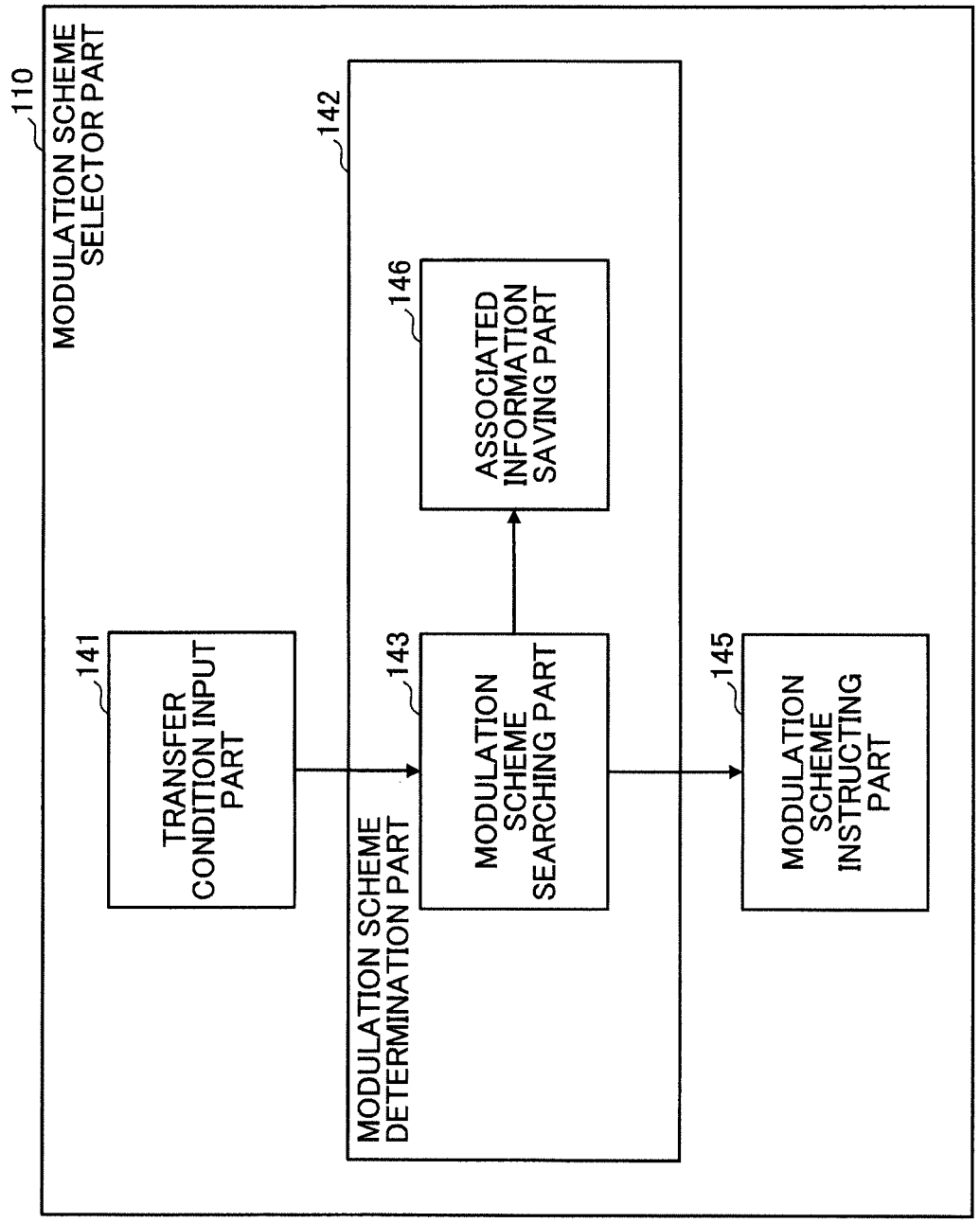

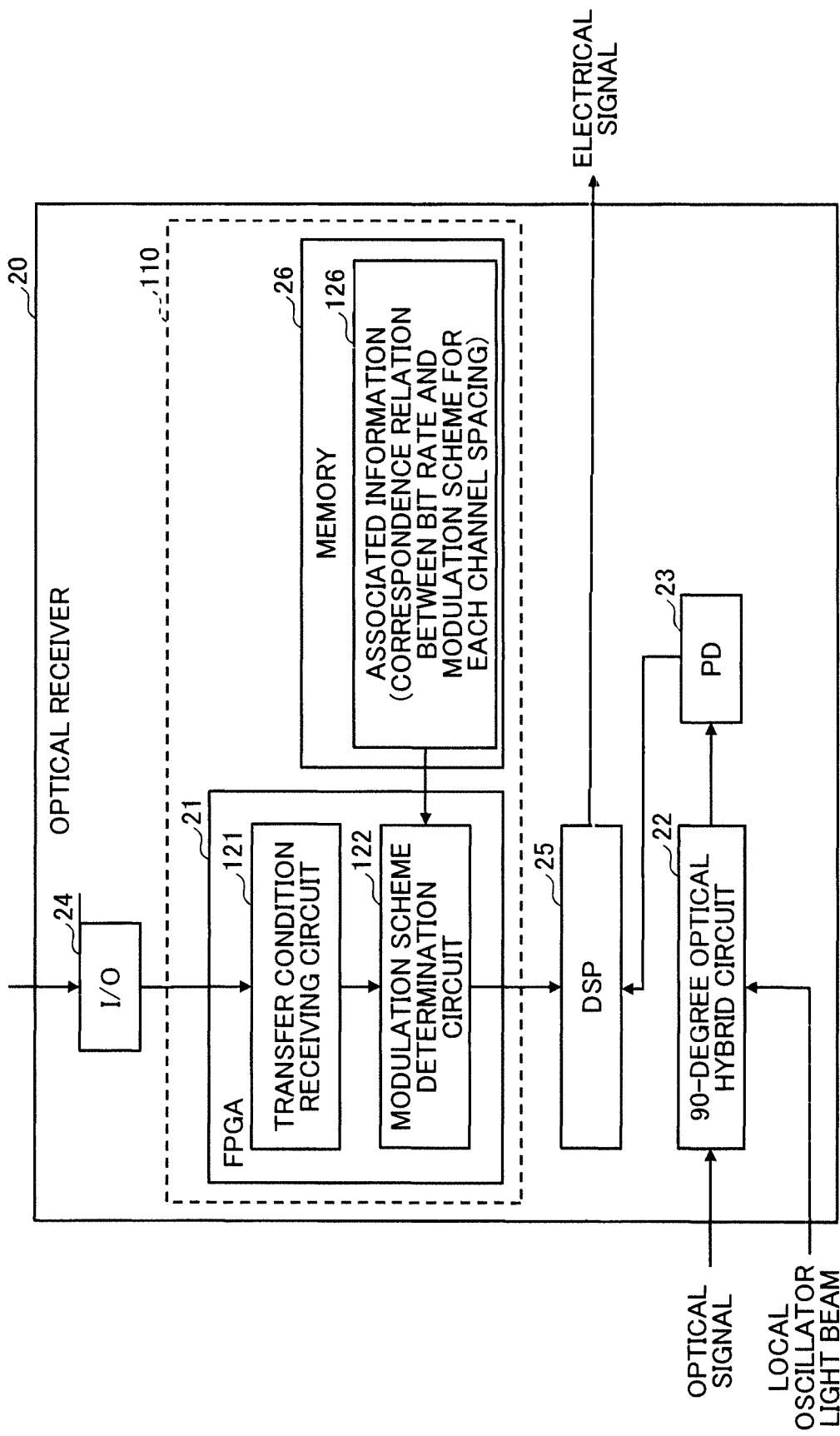

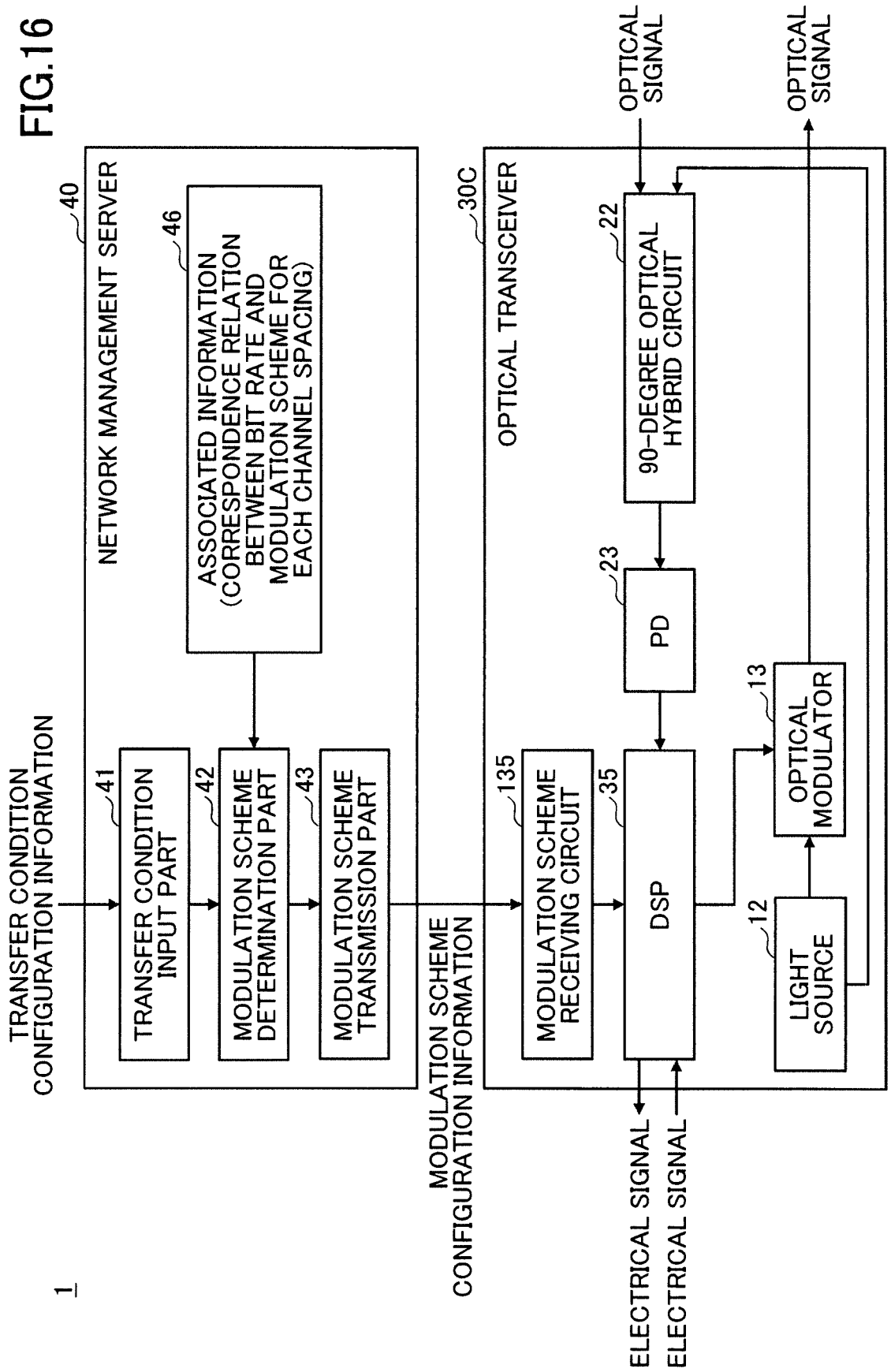

US 10,715,363 B1

OPTICAL COMMUNICATION APPARATUS, SERVER APPARATUS, AND OPTICAL TRANSPORT SYSTEM

CROSS-REFERENCE TO RELATED APPLICATIONS

This application is based upon and claims priority to earlier filed Japanese Patent Application No. 2019-030833 filed Feb. 22, 2019, which is incorporated herein by reference in its entirety.

FIELD

The present invention relates to an optical communication apparatus, a server apparatus, an optical transport system, and an optical communication method.

BACKGROUND

In response to growing demand for expansion of data transmission volume, digital coherent techniques have been widely spreading to achieve high-speed high-capacity optical communications. With a digital coherent technique, a received light signal is detected using a local oscillation light beam, and digital processing is applied after optical-to-electrical conversion of the detected light signal to compensate for waveform distortion generated on the optical transmission path. Since individual chromatic dispersion compensators as well as optical amplifiers for compensating for the insertion loss, which have been required in a conventional technique, are omitted, the system can be downsized and stabilized, while achieving cost reduction.

For a next-generation optical transponder equipped with a digital signal processor, adaptive modulation schemes are discussed. In adaptive modulation, a bandwidth or a bit rate of a network is selective and the system will operate with a modulation scheme suitable to the selected bit rate. However, in reality, it is difficult to use appropriately adaptive modulation because the spectrum width expands upon increase of a baud rate responsive to an increased bit rate. Besides, baud rate is limited due to limit in speed of a digital-to-analog converter (DAC), and it cannot be increased beyond the limit of the DAC speed.

An optical communication technique capable of maintaining a transmission quality and suppressing an increase in power consumption is desired when performing adaptive modulation in accordance with a data transfer condition such as a channel spacing or a bit rate.

A new modulation scheme, 4-dimensional m-ary amplitude, n-ary phase shift keying (4D-mAnPSK) is proposed. See, for example, Japanese Laid-open Patent Publication No. 2017-513347. It is proposed to use, for example, 4D-2A8PSK and 4D-2A16QAM in place of conventional DP-8QAM and DP-16QAM.

SUMMARY

In one aspect of the invention, an optical communication apparatus has
an interface circuit that acquires transfer condition information including a bit rate and a channel spacing of an optical network,
a processor that selects a modulation scheme in accordance with the transfer condition information and operates in the modulation scheme,
wherein the processor is configured to select a first modulation scheme when the bit rate is greater than a first value in accordance with the channel spacing, and select a second modulation scheme when the bit rate is smaller than the first value, the second modulation scheme having a data transfer performance higher than the first modulation scheme.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1 is a diagram for explaining a technical problem arising in use of 4D-mAnPSK;
FIG. 6 is a schematic diagram of a hardware structure of an optical transmitter which is an example of an optical communication apparatus of an embodiment;
FIG. 7 is a functional block diagram of the optical transmitter of FIG. 6;
FIG. 8 is a schematic diagram of a hardware structure of an optical receiver which is an example of an optical communication apparatus of an embodiment;
FIG. 16 is a schematic diagram illustrating a server apparatus and an optical transceiver used in an optical transport system of an embodiment.

DESCRIPTION OF EMBODIMENTS

In the embodiment, a threshold for adaptively switching a modulation scheme is selected in accordance with the channel spacing set in the optical transport system. When a bit rate is over the threshold, an optical signal is transmitted in a first modulation scheme (for example, a quadrature amplitude modulation (QAM)). When a bit rate is lower than the threshold, an optical signal is transmitted in a second modulation scheme (for example, 4D-mAnPSK) that has a higher performance of fiber optic data transfer, but requires greater amount of computation for determination of a constellation point, than the first modulation scheme. Thus, adaptive modulation in accordance with the channel spacing and the bit rate is performed.

In this specification and appended claims, "switching" between the first modulation scheme and the second modulation scheme means changing of the modulation technique itself, and it is distinguished from a case in which the level of multilevel modulation (or the number of bits per symbol) is changed in the same modulation technique. For example, when the modulation principle itself is changed between, for example, QAM and 4D-mAnPSK, it is called "switching a modulation scheme". On the other hand, when the level of multilevel modulation is changed between, for example, 16 QAM and 64 QAM in the same QAM method, it is called "changing a level of multilevel" in modulation.

Prior to describing particulars of the structures and methods of the embodiments, explanation is made to technical problems in the conventional 4D-mAnPSK found by the inventors, with reference to FIG. 1 to FIG. 4.

4D-mAnPSK provides "m" amplitude levels and "n" optical phases using four light components, XI (X-polarized wave, in-phase component), XQ (X-polarized wave, quadrature component), YI (Y-polarized wave, in-phase component), and YQ (Y-polarized wave, quadrature component). In order to achieve a higher bit rate over 400 Gbps, the "m" value or the "n" value of 4D-mAnPSK needs to be increased. Because the 4D-mAnPSK scheme has a greater number of signal points on the constellation plane (i.e., I-Q plane) compared to a QAM scheme, the distance between constellation points becomes shorter as the number of bits per symbol increases, and the transmitter will exceed the margin not meeting with the required conditions faster than QAM schemes. Besides, the amount of computation for determining a constellation point is greater than QAM schemes, and the limit of power consumption is easily breached when the level of multilevel in modulation (i.e., the number of bits per symbol) increases.

Figure 2A:
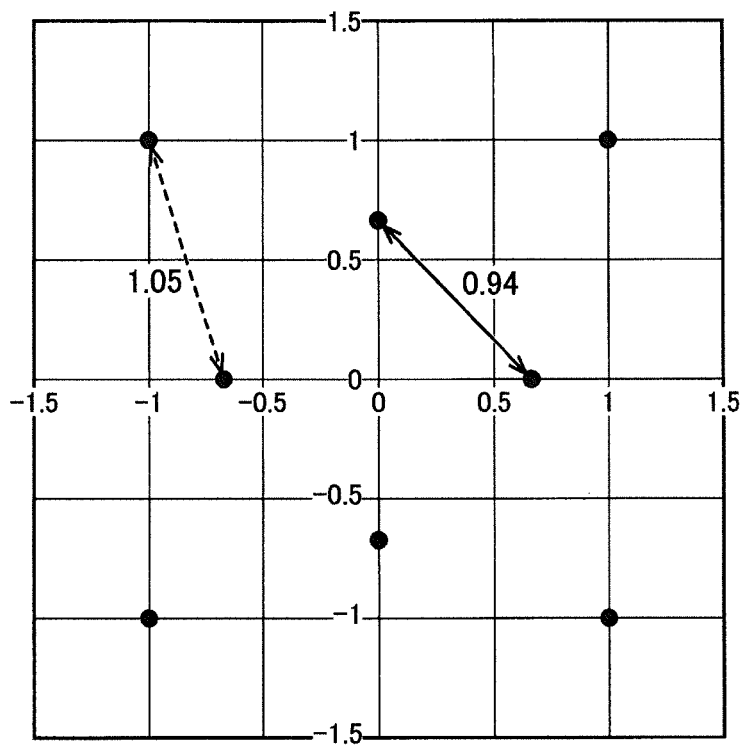
FIG. 2A is a diagram for explaining a technical problem arising in use of 4D-mAnPSK.
Figure 2B:
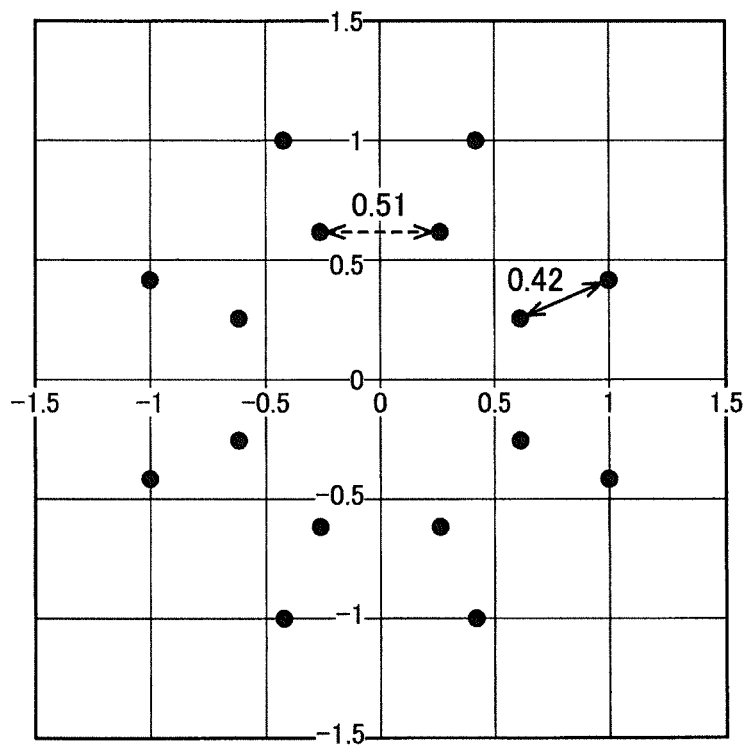
FIG. 2B is a diagram for explaining a technical problem arising in use of 4D-mAnPSK.

FIG. 1, FIG. 2A, and FIG. 2B are diagrams for explaining the first problem arising in use of 4D-mAnPSK. The horizontal axis in FIG. 1 represents level of modulation (bits per symbol), and the vertical axis represents distance between signal constellation points on an I-Q plane. The distance between signal constellation points on the I-Q plane is designed so as to be greater than or at least equal to the minimum threshold required, taking into account the effective number of bits (SNOB), variations due to noise or distortion generated by the optical device, and other factors.

Comparing between DP-8QAM and 4D-2A8PSK, there are a greater number of constellation points on the I-Q plane with 4D-2A8PSK. When the level of modulation or the number of bits per symbol is increased, the distance between constellation points becomes less than the threshold earlier in 4D-2A8PSK.

FIG. 2A and FIG. 2B are constellation diagrams of DP-8QAM and 2A8PSK, respectively. The bidirectional solid arrows represent the minimum distances between signal constellation points, and the bidirectional dashed arrows represent reference distances.

In FIG. 2A, DP-8QAM carries out 3-bits/symbol modulation per polarization. In using two polarized waves whose directions of polarization are orthogonal to each other, 6-bits/symbol modulation is achieved. The minimum distance between signal constellation points is 0.94, and the reference distance is 1.05.

In the 4D-2A8PSK of FIG. 2B, signal constellation points are distributed such that when the amplitude of the X-polarized wave is r1 (for example, the inner circle) in a certain time slot, the amplitude of the Y-polarized wave becomes r2 (for example, the outer circle), and that when the amplitude of the X-polarized wave is r2 (for example, the outer circle), the amplitude of the Y-polarized wave becomes r1 (for example, the inner circle). Under this limitation in amplitude, the power for each symbol is maintained constant, while 3 bits in the phase direction of X-polarized wave, 3 bits in the phase direction of Y-polarized wave, and the total of 6-bits per symbol modulation is performed. With 4D-2A8PSK, the minimum distance between signal constellation points is 0.42 and the reference distance is 0.51.

Returning to FIG. 1, for example, in 6-bits/symbol modulation, the distance between signal constellation points becomes shorter than the minimum threshold required for a transmitter in both DP-8QAM and 4D-2A8PSK. Because 4D-2A8PSK is designed such that the power per symbol is maintained constant, the influence of cross-phase modulation between adjacent channels is small, and fiber optic data transfer performance is better than DP-8QAM at the same amount of data.

However, 4D-2A8PSK has less margin in the distance between signal constellation points, and in reality, it cannot accommodate increase in the level of modulation. In contrast, DP-aQAM can increase the level of modulation compared to 4D-2A8PSK.

Figure 3A:
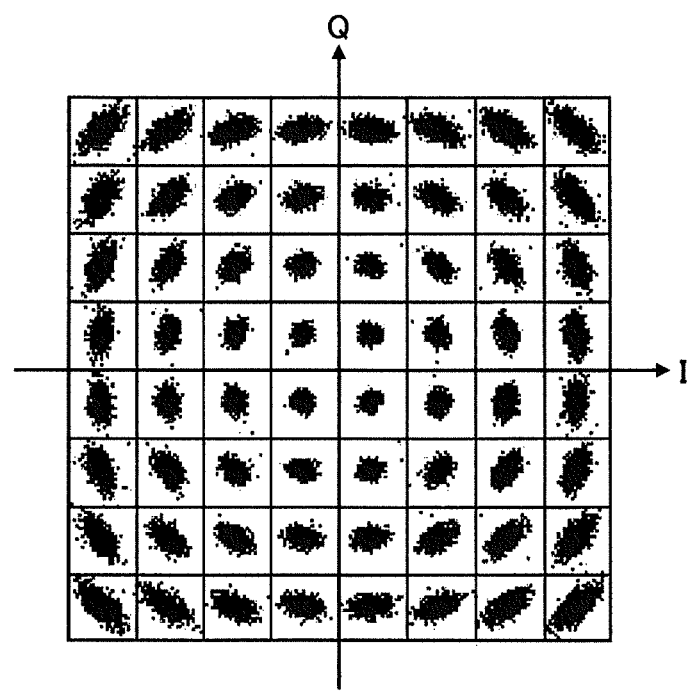
FIG. 3A is a diagram for explaining a technical problem arising in use of 4D-mAnPSK.
Figure 3B:
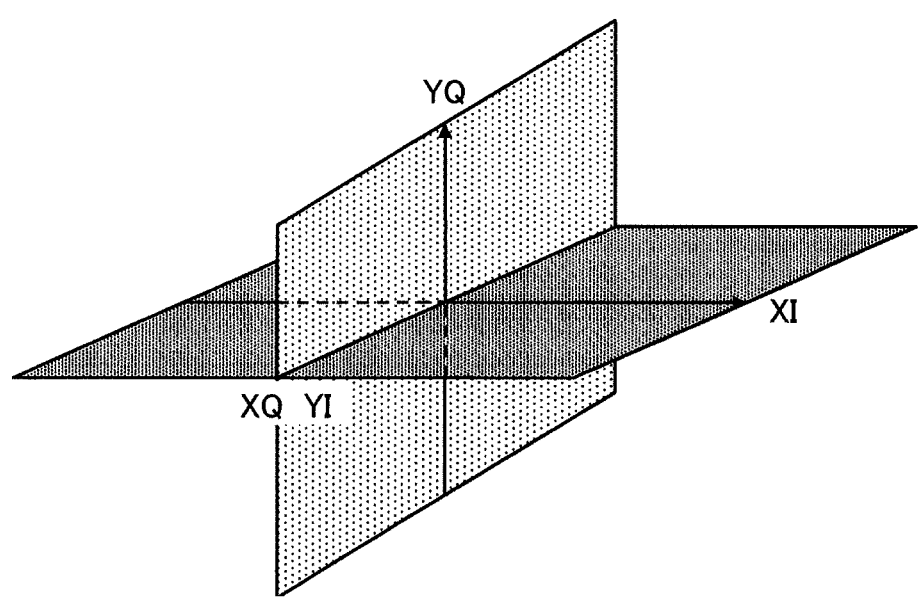
FIG. 3B is a diagram for explaining a technical problem arising in use of 4D-mAnPSK.
Figure 4:
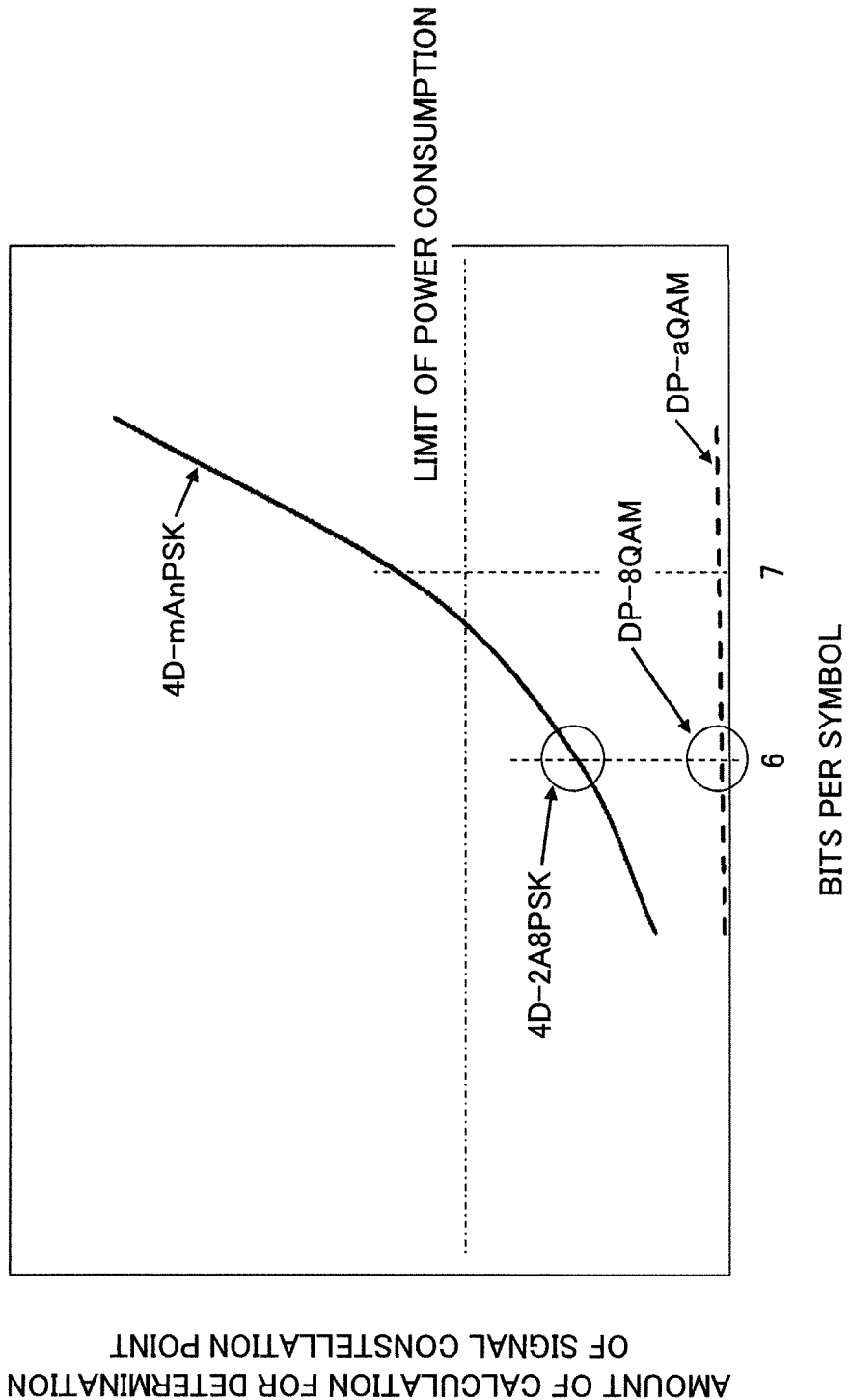
FIG. 4 is a diagram for explaining a technical problem arising in use of 4D-mAnPSK.

FIG. 3A, FIG. 3B, and FIG. 4 are diagrams for explaining the second problem arising in use of 4D-mAnPSK. In a DP-aQAM optical receiver, the received signal is plotted on the I-Q plane after being split into X-polarized wave and Y-polarized wave, as illustrated in FIG. 3A. The I-Q plane is divided into multiple areas corresponding to constellation points, and it is determined to which constellation point the received signal is the closest. For example, in 64 QAM, the received signal is plotted on the I-Q plane as illustrated in FIG. 3A and the area to which the received signal belongs is determined with less amount of calculation.

In FIG. 3B, with a 4D-mAnPSK optical receiver, in order to enhance the optical signal to noise ratio (OSNR) tolerance, the received signal is plotted into a constellation space expressed by I-Q planes of X-polarization and Y-polarization after being split into X-polarized wave and Y-polarized wave. Then it is determined to which constellation points in the constellation space the received signal corresponds. It is difficult in a constellation space with four axes of XI, XQ, YI and YQ to divide the space into sub-spaces corresponding to constellation points and determine which coordinates correspond to which constellation point.

For this reason, the distances from the measured received signal to all the constellation points are calculated, and the constellation point with the minimum distance is selected as the received data. In k-bits/symbol modulation, $2^k$ comparisons are required. Using 6-bits/symbol 4D-2A8PSK, $2^6$, namely 64 comparisons are performed to determine the constellation point with the minimum distance. The amount of computation is heavy compared to that in DP-aQAM modulation.

As illustrated in FIG. 4, the amount of calculation for determining a signal constellation point increases exponentially with 4D-mAnPSK, and the power consumption will easily exceed the upper limit. Upon exceeding the power consumption limit, the digital signal processor (DSP) causes thermorunaway, incapable of releasing or dissipating heat. In contrast, in DP-aQAM, the amount of calculation for determination of a constellation point does not vary so much even when the level of modulation of the number of bits per symbol increases.

There is another problem with respect to wavelength division multiplexing (WDM). In WDM, many signals with different wavelengths are combined and split by a multiplexer/demultiplexer such as an arrayed waveguide grating (AWG). The AWG grid is fixed, and it cannot accommodate signals with new wavelength intervals.

The baud rate that is becoming feasible at present is about 60 Gbaud. The baud rate and the spectrum width are in a proportional relationship, and at least 75 GHz wavelength separation is required to carry out WDM-transmission of a 60 Gbaud light signal. When applying adaptive modulation to an existing WDM device, and when the WDM device uses a multiplexer/demultiplexer with a fixed channel spacing of 50 GHz for a signal type of about 40 Gbaud, it cannot combine or separate light spectra at a wider wavelength separation. With an AWG with a wavelength spacing of 50 GHz, the edges of the spectrum of a 60-Gbaud optical signal is cut off. However, there are customer demands for increased bit rates, while keeping the existing channel spacing.

To meet with such customer demands and solve the technical problems described above with reference to FIG. 1 to FIG. 4, the embodiment provides a threshold for adaptively choosing a modulation scheme, the threshold being selected in accordance with the channel spacing. When the bit rate exceeds the selected threshold, a first modulation scheme such as aQAM is used, and when the bit rate is less than the selected threshold, a second modulation scheme such as 4D-mAnPSK is used. This achieves adaptive modulation suitable to the channel spacing and bit rate actually in use.

<1. Associated Information>

Figures 5A, 5B:
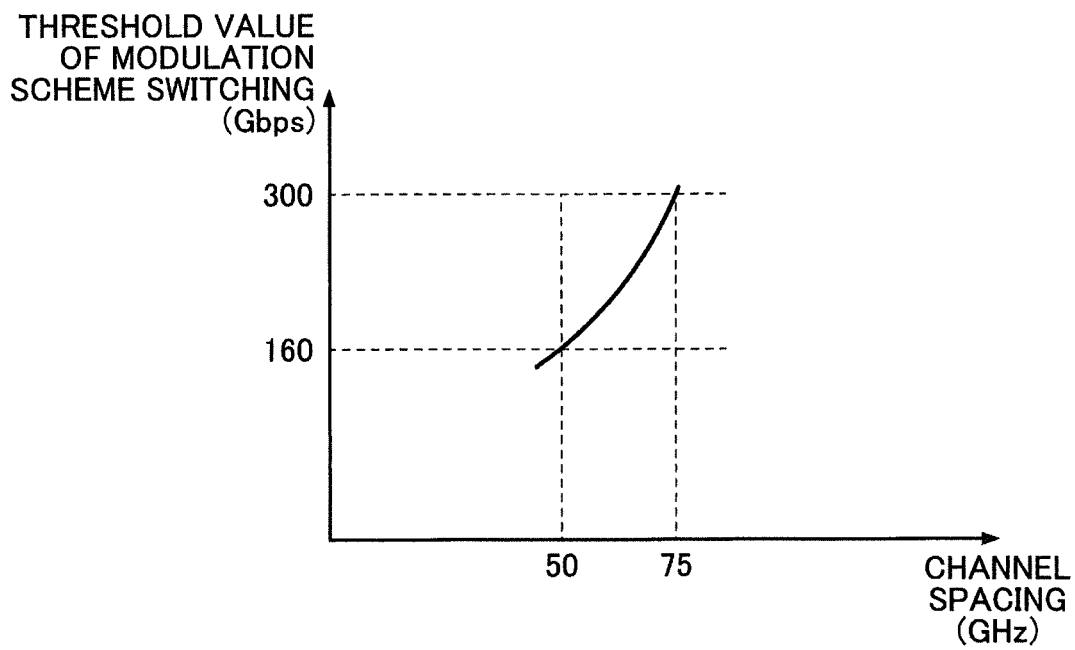
FIG. 5A illustrates an example of associated information representing a correspondence relation between bit rate and modulation scheme at each channel spacing.
FIG. 5B illustrates a relation between channel spacing and threshold value for switching modulation scheme.

FIG. 5A illustrates an example of associated information used in the embodiment that describes a correspondence relation between bit rate and modulation scheme at each channel spacing. Modulation schemes to be used are associated with available bit rates at each channel spacing. A baud rate, a threshold to be used, or the like may be associated with each of the channel spacings.

When a channel spacing set on a transmission path differs, the optimum modulation scheme to be selected may also be different in order for achieving the same bit rate. For example, at a channel spacing of 50 GHz, the average baud rate will be 40 Gbaud due to limitation in the Ospectral width. In this case, the upper limit of the bit rate is 300 Gbps because the maximum level in multilevel modulation is DP-64QAM taking the OSNR tolerance into account.

At a bit rate of 150 Gbps, 4D-2A8PSK that takes a greater amount of computation with smaller separations in constellations, but has a better data transfer performance (for example, with a higher tolerance to fiber optic nonlinearity) is used. At this low bit rate, the amount of computation and the signal point separation of 4D-2A8PSK are in acceptable ranges, and the data transfer quality is better than DP-8QAM when implementing the same bit rate.

However, when the level in multilevel modulation is raised along with an increased bit rate, the amount of computation and the signal point separation of 4D-mAnPSK do not meet with the acceptable ranges any longer. Accordingly, DP-16 QAM is adopted at 200 Gbps, and DP-64QAM is adopted at 300 Gbps.

At the channel spacing of 75 GHz, signals of a baud rate up to 60 Gbaud can be transmitted. In this case, 200 Gbps data transfer can be achieved using 4D-2A8PSK. Under the same data amount of 6-bits/symbol, 4D-2A8PSK has a higher tolerance to nonlinearity or other fiber-optics transmission properties compared with a QAM scheme.

When the bit rate exceeds 200 Gbps, the amount of computation and the distance between signal constellation points do not meet with the required conditions of 4D-mAnPSK, and using a QAM scheme is appropriate. For example, when the bit rate is 400 Gbps or more, DP-16QAM may be adopted. With DP-16QAM, a data amount of 8 bits/symbol (4×2 bits per symbol) can be transmitted by one modulation. At the bit rate of 500 Gbps, DP-32QAM is used, and at 600 Gbps, DP-64QAM is used. Even when the bit rate increases to this extent, the distance between signal constellation points still has a margin, and the level in multilevel modulation can be raised until approaching the threshold limit. Besides, the amount of calculation for determining a constellation point is almost unchanged even through the level in multilevel modulation is increased. Accordingly, increase in power consumption can be suppressed.

At 300 Gbps, in order to carry out 7-bits/symbol modulation, hybrid modulation combining, for example, 4D-2A8PSK and DP-16QAM may be employed. Performing 6-bits/symbol 4D-2A8PSK and 8-bits/symbol DP-16QAM at a one-to-one ratio in a time sharing manner, 7-bits/symbol modulation is achieved on average.

In place of hybrid modulation, 7-bits/symbol 4D-2A8PSK scheme (abbreviated to "7b4D-2A8PSK") may be used. In 7b4D-2A8PSK, bit B[0] to bit B[6] are modulation bits, bit B[7] is a parity bit with an inverted value of bit B[6], and these bits are distributed on the Poincare sphere. For more information about 7b4D-2A8PSK, please see Kojima et al, "5 and 7 bit/symbol 4D Modulation Formats Based on 2A8 PSK", Proceedings, ECOC 2016-42nd, Sep. 18, 2016.

The threshold for switching the modulation scheme is different between channel spacing of 50 GHz and 75 GHz. At a channel spacing of 75 GHz, the threshold is set to 300 Gbps. A QAM scheme is used when the bit rate is greater than 300 Gbps, and a 4D-mAnPSK scheme is used when the bit rate is less than 300 Gbps. At a bit rate of 300 Gbps, hybrid modulation is employed.

At a channel spacing of 50 GHz, a value between 150 Gbps and 200 Gbps, such as 160 Gbps or 170 Gbps, is selected as a threshold. When the bit rate is greater than the selected threshold, a QAM scheme is used. When the bit rate is less than the selected threshold, a 4D-mAnPSK scheme, which needs a greater amount of computation, but provides better transmission quality, is used.

FIG. 5B illustrates a relationship between channel spacing (GHz) and threshold for switching modulation scheme. The channel spacing and the threshold are in a monotonically increasing relationship. The narrower the channel spacing, the lower the modulation scheme switching threshold. This is explained as below. Focusing on, for example, DP-16QAM at channel spacings of 50 GHz and 75 GHz, the bit rate is lower at 50-GHz separation than at 75-GHz separation because of a lower baud rate. For the same reason, a threshold level for switching the modulation scheme is lower at 50-GHz separation than at 75-GHz separation. When the channel spacing (i.e., wavelength separation) is 100 GHz, a threshold greater than 300 Gbps will be used for switching between modulation schemes.

In the embodiment, a threshold value for switching between modulation schemes is selected in accordance with the channel spacing set in the network, and an appropriate modulation scheme is determined based on the bit rate.

<2. Configuration Example of Optical Transmitter>

FIG. 6 is a schematic diagram illustrating a hardware structure of the optical transmitter 10 according to the embodiment. The optical transmitter 10 is an example of an optical communication apparatus, and it has a field programmable gate array (FPGA) 11, a light source 12, an optical modulator 13, an input/output interface (denoted as "I/O" in the FIG. 14, a DSP 15, and a memory 16.

The FPGA 11 has a transfer condition receiving circuit 111 and a modulation scheme determination circuit 112. The transfer condition receiving circuit 111 receives transfer condition configuration information via the input/output interface 14. The transfer condition configuration information includes transfer conditions such as WDM channel spacing (or wavelength separation), a bit rate, etc.

The modulation scheme determination circuit 112 identifies the channel spacing and the bit rate contained in the transfer condition configuration information, and referring to associated information 116 saved in the memory 16, determines a modulation scheme in accordance with the bit rate and the channel spacing. The associated information 116 describes, for example, a correspondence relation between a modulation scheme and each of bit rates at each channel spacing, as illustrated in FIG. 5A. A threshold for switching between modulation schemes may be described in the information as necessary.

The modulation scheme determined is input to the DSP 15. The FPGA 11 and the memory 16 may form a modulation scheme selector part 110, which will be described below.

Upon input of an electrical data signal for transmission, the DSP 15 performs error correction coding, maps the data onto the constellation according to the specified modulation scheme, and produces a signal representing the logic value of the data signal. The signal is subjected to digital-to-analog conversion and applied to the signal electrode of the optical modulator 13.

The light beam emitted from the light source 12 and incident on the optical modulator 13 from the light source 12 is modulated by an analog drive signal. The modulated light signal is output to the optical network.

The configuration of FIG. 6 is just an example, and the invention is not limited to this example. The associated information 116 may be stored in a memory block in the FPGA 11 or in an internal memory of the DSP 15. The FPGA 11 is an example of a logic device, and an alternative logic device such as a complex programmable logic device (CPLD) may be used. Instead of using a separate logic device such as the FPGA 11, the DSP 15 may be designed to receive the transfer condition configuration information and determine the modulation scheme.

As long as the modulation scheme is selected in accordance with the channel spacing and the bit rate from the associated information 116, any appropriate configuration may be employed.

FIG. 7 is a functional block diagram of the modulation scheme selector part 110. As has been described above, the modulation scheme selector part 110 may be implemented by the FPGA 11 and the memory 16, or alternatively, it may be implemented only by the FPGA when the FPGA 11 has a built-in memory.

The modulation scheme selector part 110 includes a transfer condition input part 141, a modulation scheme determination part 142, and a modulation scheme instructing part 145. The modulation scheme determination part 142 includes a modulation scheme searching part 143 and an associated information saving part 146. The information saved in the associated information saving part 146 may be table information as illustrated in FIG. 5A or a function that describes the relationship between the bit rate and the modulation scheme at each of the channel spacings.

The modulation scheme searching part 143 specifies the channel spacing from the information received at the transfer condition input part 141, and searches in the associated information saving part 146, for example, checking the associated field of a table, to specify the modulation scheme corresponding to the bit rate contained in the information. The modulation scheme instructing part 145 outputs the specified modulation scheme to the DSP 15.

When a function is saved in the associated information saving part 146, the function may describe the relation so as to select DP-aQAM when the bit rate is greater than the threshold at a given channel spacing, and select 4D-mAnPSK when the bit rate is less than the threshold. The function may further describe so as to select a hybrid scheme of DP-aQAM and 4D-mAnPSK when the bit rate is equal to the threshold value.

In the optical transmitter 10, an appropriate modulation scheme is selected in response to the bit rate at a given channel spacing, and the data transfer quality is maintained satisfactorily, while suppressing the power consumption from increasing.

<3. Configuration Example of Optical Receiver>

FIG. 8 is a schematic diagram of an optical receiver 20 according to the embodiment. The optical receiver 20 is an example of the optical communication apparatus, and it has an FPGA 21, a 90-degree optical hybrid circuit 22, a set of photodetectors (denoted as "PD" in the drawing) 23, an input/output interface (denoted as "I/O" in the FIG. 24, a DSP 25, and a memory 26.

The FPGA 21 includes a transfer condition receiving circuit 121 and a modulation scheme determination circuit 122. The transfer condition receiving circuit 121 receives transfer condition configuration information via the I/O interface 24. The modulation scheme determination circuit 122 searches in the associated information 126 saved in the memory 26, of which the information describes the relationship between bit rate and modulation scheme for each channel spacing, to determine a modulation scheme in accordance with the currently configured channel spacing and bit rate. The selected modulation scheme is input to the DSP 25.

As in the optical transmitter 10, the FPGA 21 and the memory 26 may form a functional block of the modulation scheme selector part 110. When the FPGA 21 has a built-in memory, the modulation scheme selector part 110 may be formed by the FPGA 21 solely.

The 90-degree optical hybrid circuit 22 detects a received light signal using a local oscillation light beam and outputs components of XI, XQ, YI, and YQ. Each of the XI, XQ, YI, and YQ components are detected as a photocurrent by the associated photodetector 23, and converted into an analog voltage by a transimpedance amplifier or the like. The analog signal is then digitally sampled, and input to the DSP 25.

The DSP 25 performs digital signal processing including compensation for chromatic dispersion and waveform distortion on the input digital signal. The DSP 25 then allocates the digitally compensated data onto the corresponding constellation points according to the selected modulation scheme, and demaps the constellation points to a bit sequence. When DP-aQAM has been selected, it is simply determined to which area on the constellation plane the coordinate point of the detected signal belongs, and the amount of calculation is small. When 4D-mAnPSK has been selected, a constellation point the closest from the coordinate point of the detected signal is determined in the three-dimensional space. Although, in this case, the amount of computation increases, the data transfer quality including tolerance to fiber optic nonlinearity is maintained at high quality. The acquired bit sequence is then subjected to error correction and decoding, and output as an electrical signal.

In the optical receiver 20, a modulation scheme is selected in response to the currently configured channel spacing and bit rate. For the adaptive modulation, increase in power consumption can be suppressed, while maintaining the data transfer quality satisfactorily.

<4. Configuration Example of Optical Transceiver>

Figure 9:
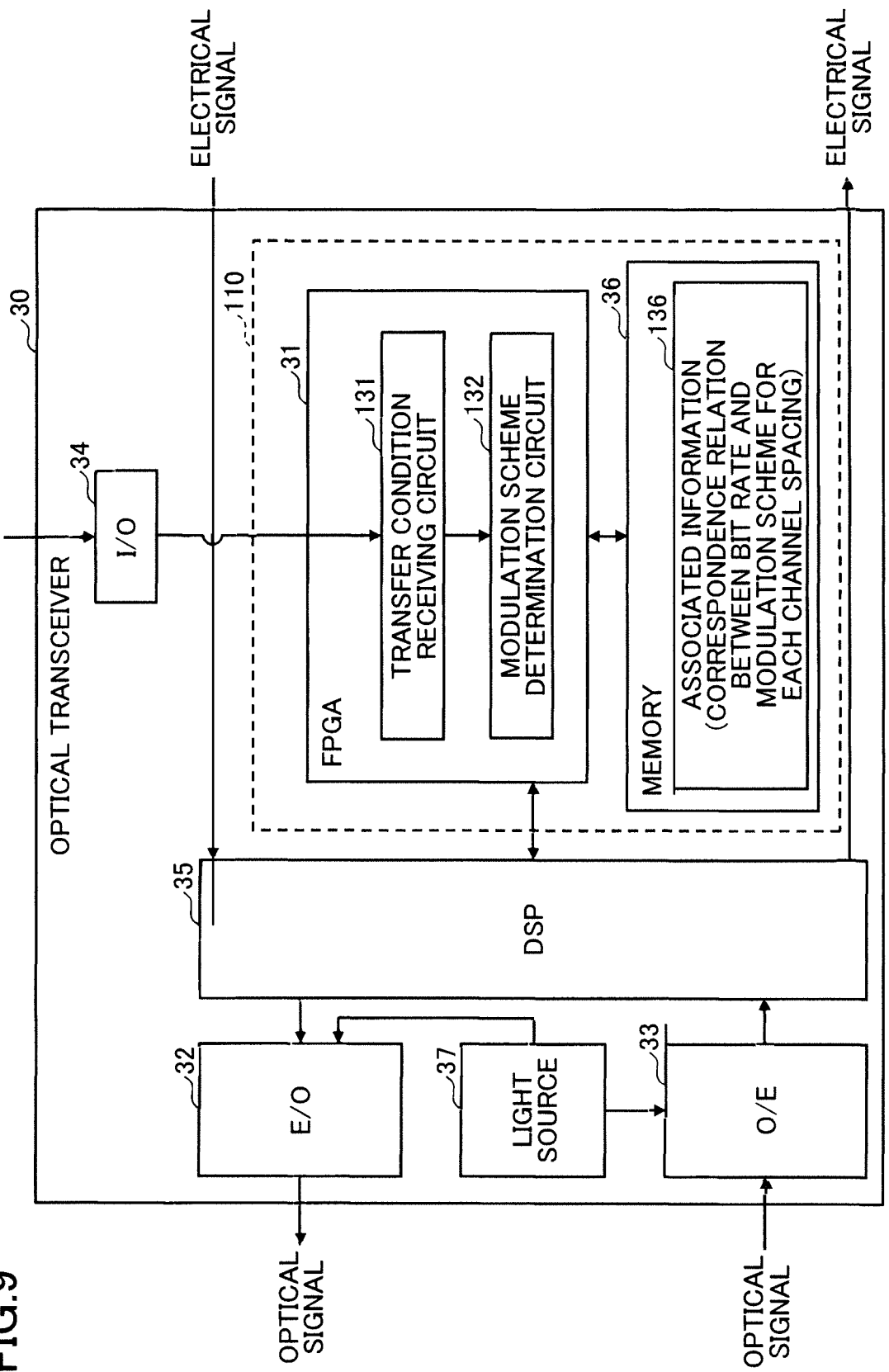
FIG. 9 is a schematic diagram of a hardware structure of an optical transceiver which is an example of an optical communication apparatus of an embodiment.

FIG. 9 is a schematic diagram of an optical transceiver 30. Since in general optical communications are implemented bidirectionally, the configuration for adaptively selecting a modulation scheme in response to the channel spacing and the bit is applicable to the optical transceiver 30 with the optical transmitter 10 of FIG. 6 and the optical receiver 20 of FIG. 8 integrated therein.

The optical transceiver 30 is an example of the optical communication apparatus, and it has an FPGA 31, an electrical to optical conversion circuit (denoted as "E/O" in the FIG. 32, and an optical to electrical conversion circuit (denoted as "O/E" in the FIG. 33, an input and output interface (denoted as "I/O" in the FIG. 34, a DSP 35, a memory 36, and a light source 37.

The FPGA 31, the DSP 35, and the memory 36 may be shared between the transmission block and the reception block. The FPGA 31 has a transfer condition receiving circuit 131 and a modulation scheme determination circuit 132. The transfer condition receiving circuit 131 receives transfer condition configuration information via the I/O 34. The transmission condition configuration information includes transfer conditions such as channel spacing and bit rate. The modulation scheme determination circuit 132 searches for the associated field of the associated information 136 stored in the memory 36 based upon the channel spacing, and determines a modulation scheme in accordance with the bit rate at the given channel spacing. The determined modulation scheme is input to the DSP 35.

The FPGA 31 and the memory 36 may form a functional block of the modulation scheme selector part 110. When the FPGA 31 has a built-in memory, the associated information 136 may be saved in the built-in memory of the FPGA 31. In the latter case, the modulation scheme selector part 110 may be implemented solely by the FPGA 31.

For the transmission block, the DSP 35 maps a data signal to be transmitted to the constellation points on the I-Q plane according to the configured modulation scheme, and generates digital signals according to the logical values of the data signal. At the E/O 32, the digital signals are converted into high-frequency analog drive signals and input to an optical modulator.

A light beam emitted from the light source 37 is incident on the optical modulator of the E/O 32, modulated by the analog drive signals, and then output as optical signals.

For the reception block, the DSP 35 performs digital signal processing such as compensation for chromatic dispersion and waveform distortion on the signal detected by the O/E 33 and digitally sampled. The received signal having been subjected to the digital compensation is distributed onto the constellation plane, and constellation points are determined according to the modulation scheme selected by the modulation scheme determination circuit 132. Then, data bits are recovered and output as electrical signals after error correction and decoding.

In the optical transceiver 30, a modulation scheme is selected adaptively in response to the data transfer conditions such as the channel spacing and the bit rate. For the adaptive modulation, increase in power consumption can be suppressed, while maintaining the data transfer quality satisfactorily.

<5. Operation Flow of Modulation Scheme Selection>

Figure 10:
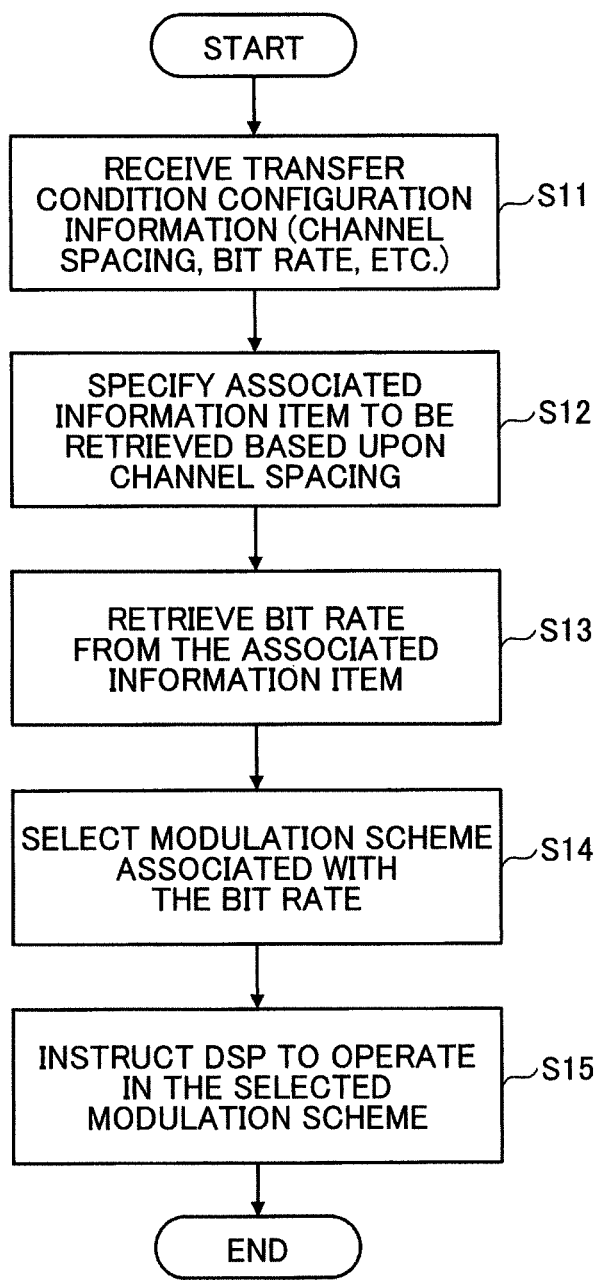
FIG. 10 is a flowchart of selecting a modulation scheme in accordance with a bit rate at a given channel spacing.

FIG. 10 is a flowchart performed by the modulation scheme selector part 110. This operation flow is carried out when, for example, the optical transceiver 30 is newly added to the network, or the optical transceiver 30 is rebooted. Alternatively, the operation flow may be carried out when an optical transponder having the optical transceiver 30 is newly introduced in the network or rebooted, as will be described later.

The operation flow of FIG. 10 is based upon a configuration in which the associated information saving part 146 of the modulation scheme determination part 142 (see FIG. 7) has a table format as illustrated in FIG. 5A. First, transfer condition configuration information is received at the transfer condition input part 141 (S11). The transfer condition configuration information includes channel spacing, bit rate, etc. The transfer condition configuration information may be received from the network as a part of an optical network supervisory signal, or it may be input by an operator who installs the optical transceiver 30 in the network.

Then, the modulation scheme searching part 143 specifies an associated field in the associated information saving part 146 based upon the channel spacing contained in the transfer condition configuration information (S12). Then the bit rate is retrieved in the associated field (S13), and the modulation scheme associated with the bit rate is determined (S14).

For example, when the channel spacing is 75 GHz and the bit rate is 400 Gbps, the field of channel spacing of 75 GHz is looked up in the table format of FIG. 5A, and the modulation scheme of DP-16QAM which is associated with 400 Gbps is selected. When the channel spacing is 75 GHz and the bit rate is 200 Gbps, the associated field is retrieved in the table format, and the modulation scheme of 4D-2A8PSK which is associated with 200 Gbps is selected. On the other hand, at the channel spacing of 50 GHz, DP-16 QAM is selected even at the same bit rate of 200 Gbps.

The modulation scheme instructing part 145 instructs the DSP 35 to operate at the determined modulation scheme (S15). The DSP 35 maps the inputted data signal onto the constellation plane according to the modulation scheme to generate electrical modulation signals for data transmission. Also, the received optical signal is converted into electrical signals, and the electrical signals are distributed onto the constellation plane to estimate the constellation points for data recovery.

With this method, a modulation scheme is selected adaptively at the optical communication apparatus, in response to the transfer conditions such as channel spacing and bit rate. Increase of power consumption is suppressed for the adaptive modulation, while maintaining the data transfer quality satisfactory.

Figure 11A:
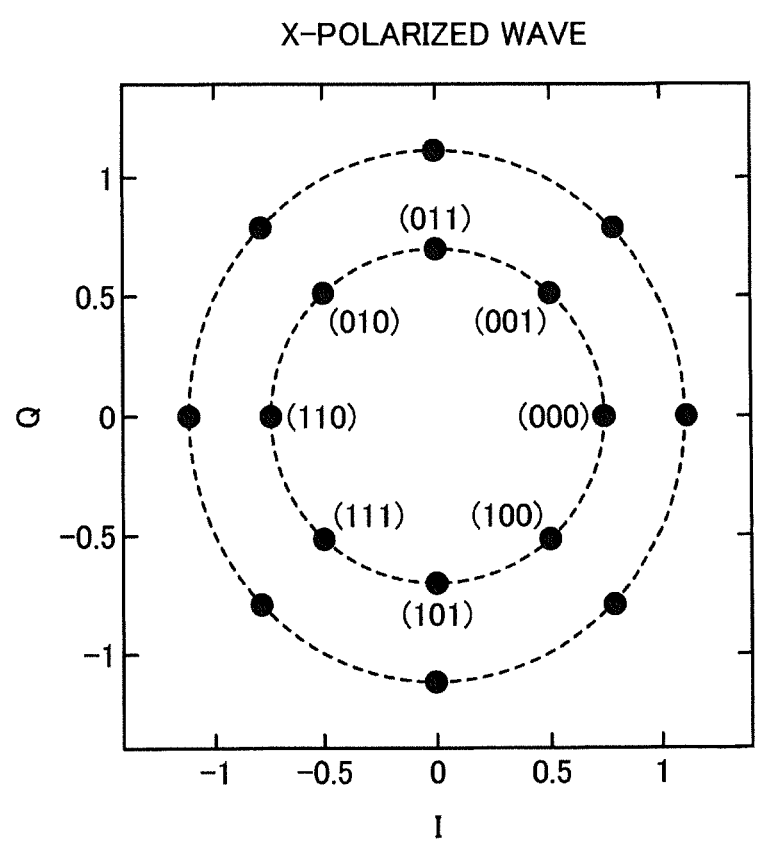
FIG. 11A is a constellation diagram of 4D-2A8PSK for X-polarized wave.
Figure 11B:
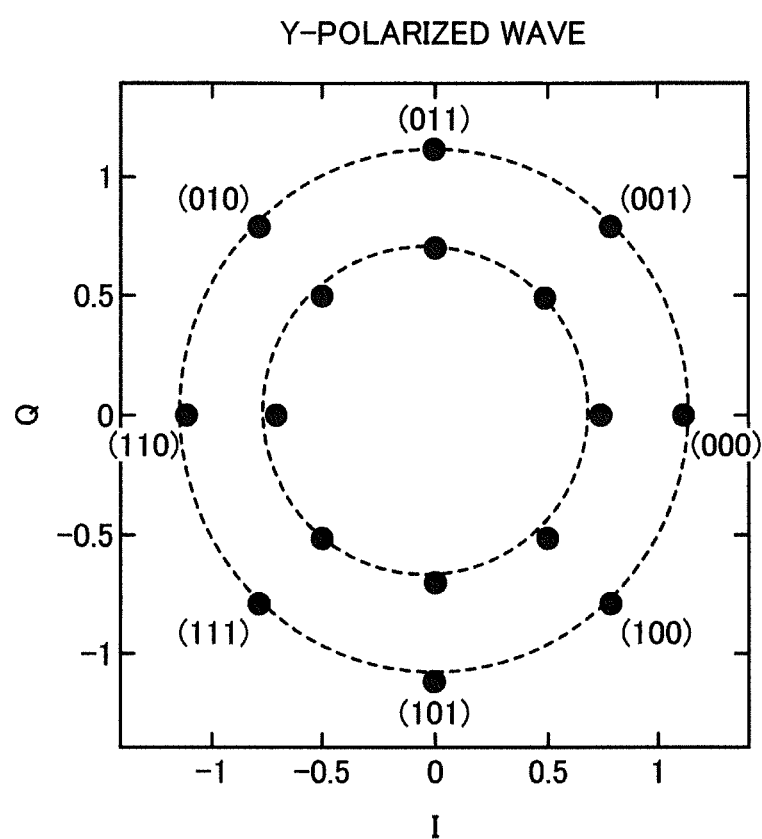
FIG. 11B is a constellation diagram of 4D-2A8PSK for Y-polarized wave.

FIG. 11A and FIG. 11B are constellation diagrams of 4D-2A8PSK. FIG. 11A illustrates constellation points for X polarization, and FIG. 11B illustrates constellation points for Y polarization. In this example, eight signal constellation points (3 bits) are distributed along the inner circle for X polarization, eight signal constellation points (3 bits) are distributed along the outer circle for Y polarization, and the total of 6-bits per symbol modulation is performed.

In this modulation scheme, constellations of the X and Y polarizations are controlled such that when the radius (i.e., the amplitude) of the constellation points of the X-polarization is r1, then the radius of the constellation points of the Y polarization becomes r2, and such that when the amplitude of the constellation points of the X polarization is r2, the amplitude of the constellation points of the Y polarization becomes r1. Under this control, the power can be maintained constant during one modulation (i.e., for one symbol).

When the number of circles is three, the value "m" of 4D-mAnPSK becomes 3 and signal constellation points are distributed at three levels of amplitude. In this case, when a first circle is allocated to one polarization at the first radius (amplitude), then the second and third radii other that the first radius are allocated to the other polarization, and constellation points are controlled such that the power is maintained constant for one symbol.

Figure 12:
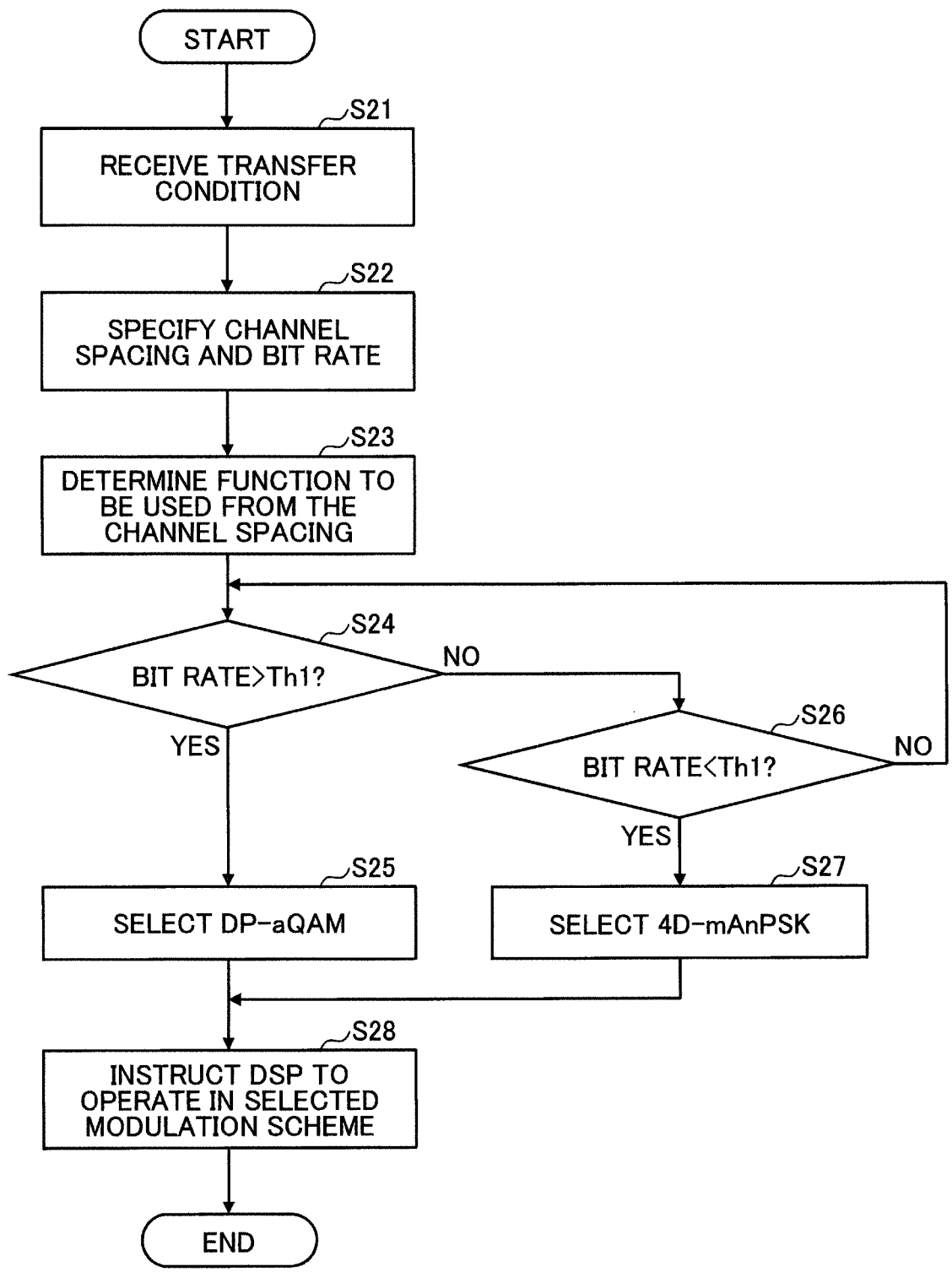
FIG. 12 is a flowchart of a modified operation of selecting a modulation scheme in accordance with a bit rate at a given channel spacing.

FIG. 12 is a flowchart of a first modification of a modulation scheme selection process performed by the modulation scheme selector part 110. The operation flow of FIG. 12 is based upon a configuration in which the associated information is defined by a function in the associated information saving part 146 of the modulation scheme determination part 142 (see FIG. 7). Such a function is defined for each channel spacing. Threshold values used in the functions may be different from one another. The function may be described as below:

"If bit rate is greater than threshold value Th1, select DP-aQAM; and

If bit rate is smaller than threshold value Th1, select 4D-mAnPSK."

When the bit rate is greater than Th1, different levels of modulation may be associated with the respective bit rates.

First, transfer condition configuration information including channel spacing and bit rate is received at the transfer condition input part 141 (S21). Then, the modulation scheme searching part 143 specifies the channel spacing and the bit rate set in the transfer condition configuration information (S22). Then the function associated with the channel spacing is retrieved in the associated information saving part 146 (S23), and it is determined whether the currently configured bit rate is greater than the threshold Th1 (S24). When the bit rate is greater than the threshold Th1 (Yes in S24), DP-aQAM is selected (S25). When the bit rate is not greater than the threshold Th1 (No in S24), it is then determined whether the bit rate is smaller than the threshold Th1 (S26). When the bit rate is smaller than the threshold Th1 (Yes in S26), 4D-mAnPSK is selected (S27). An instruction is supplied to the DSP to operate at the modulation scheme selected in S25 or S27 (S28).

For instance, when the channel spacing is 75 GHz, the value of 300 Gbps may be used as the threshold value, and a threshold-based decision is made to the designated bit rate to determine which modulation scheme is to be used. When the channel spacing is 50 GHz, the value of 175 Gbps, for example, may be used to determine a modulation scheme from the bit rate. When the specified bit rate is greater than the 300-Gbps threshold at the channel spacing of 75 GHz, a DP-aQAM equal to or higher than DP-16QAM is selected. When the specified bit rate is less than the 300-Gbps threshold at the channel spacing of 75 GHz, a 4D-mAnPSK scheme, such as 7b4D-2A8PSK, 4D-2A8PSK, etc. is selected. In place of the above-described function, another function that describes the relationship between the bit rate and the number of bits per symbol (or the amount of information of a symbol) may be used.

With this method of modulation scheme selection, optical communication apparatus can select a modulation scheme in an adaptive manner, and increase of power consumption is suppressed for the adaptive modulation, while maintaining the data transfer quality satisfactory.

Figure 13:
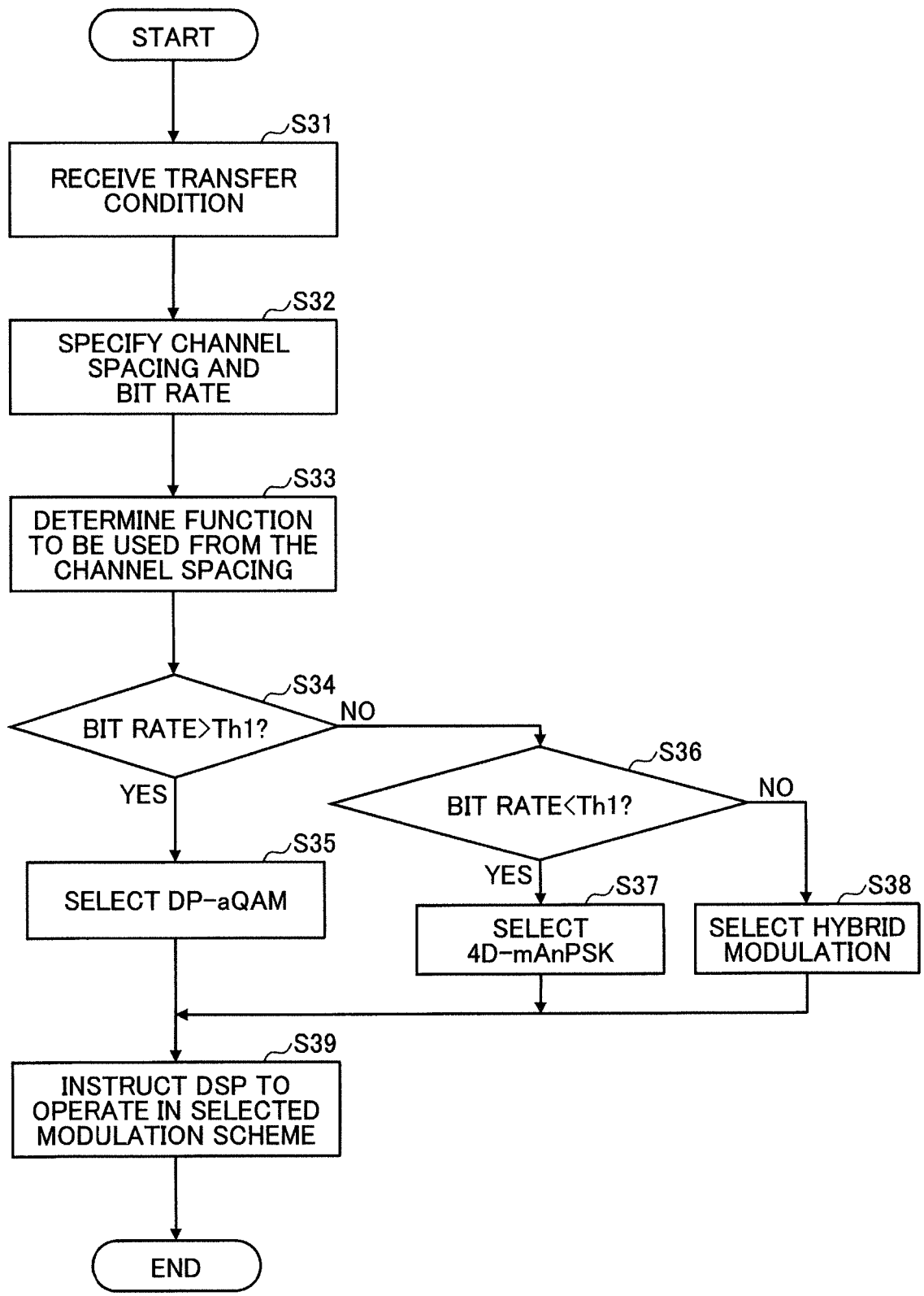
FIG. 13 is a flowchart of another modified operation of selecting a modulation scheme in accordance with a bit rate at a given channel spacing.

FIG. 13 is a flowchart of a second modification of a modulation scheme selection process performed by the modulation scheme selector part 110. The operation flow of FIG. 13 may be performed when the associated information saving part 146 of the modulation scheme determination part 142 has a hybrid modulation scheme.

First, transfer condition configuration information including channel spacing and bit rate is received at the transfer condition input part 141 (S31). Then, the modulation scheme searching part 143 specifies the channel spacing and the bit rate set in the transfer condition configuration information (S32), and determines a function corresponding to the channel spacing (S33). Then it is determined based upon the function whether the currently configured bit rate is greater than the threshold Th1 (S34). When the bit rate is greater than the threshold Th1 (Yes in S24), DP-aQAM is selected (S35).

When the bit rate is not greater than the threshold Th1 (No in S34), it is then determined whether the bit rate is smaller than the threshold Th1 (S36). When the bit rate is smaller than the threshold Th1 (Yes in S36), 4D-mAnPSK is selected (S37).

When the bit rate is equal to the threshold Th1 (No in S36), a hybrid modulation scheme combining DP-aQAM and 4D-mAnPSK is selected (S38). An instruction is supplied to the DSP to have the DSP operate at the modulation scheme selected in S35, S37, or S38 (S39).

For instance, when a function corresponding to the channel spacing of 75 GHz is selected and when the designated bit rate is greater than the threshold value of 300 Gbps, a DP-aQAM equal to or higher than DP-16QAM is selected. When the specified bit rate is less than the 300-Gbps threshold at the channel spacing of 75 GHz, a 4D-mAnPSK scheme such as 4D-2A8PSK, depending on the bit rate, is selected.

When the bit rate is 300 Gbps at the threshold, hybrid modulation combining DP-16QAM and 4D-2A8PSK may be used.

With this method of modulation scheme selection, an optical communication apparatus can adaptively select a modulation scheme in accordance with the bit rate at a given channel spacing. Power consumption is suppressed from increasing for the adaptive modulation, while maintaining the data transfer quality satisfactorily.

<6. Optical Transport System>

Figure 14:
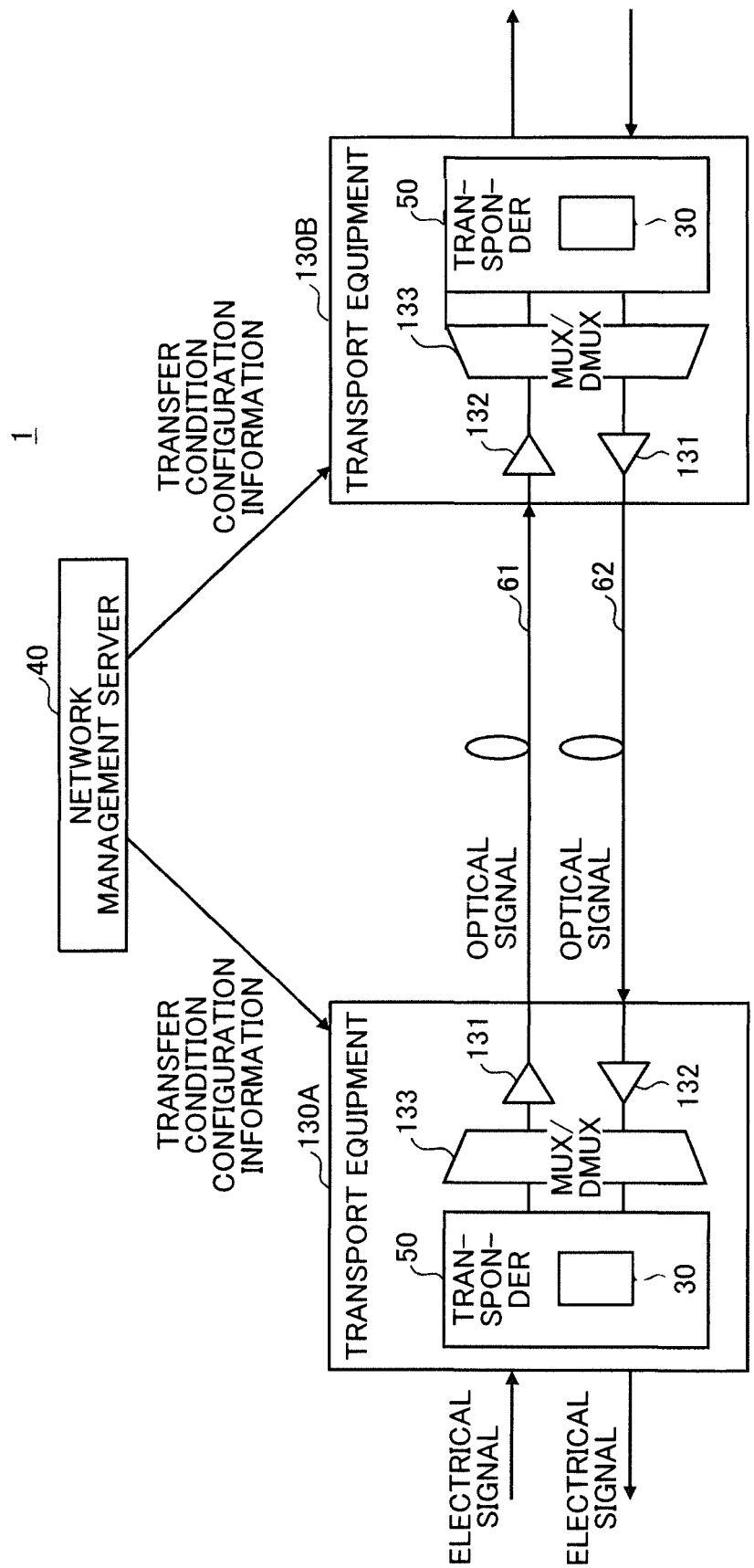
FIG. 14 is a schematic diagram of an optical transport system according to an embodiment.

FIG. 14 is a schematic diagram of an optical transport system 1 according to an embodiment. The optical transport system 1 is a part of an optical network, and it includes a transport equipment 130A, a transport equipment 130B, and a network management server 40. The transport equipment 130A and the transport equipment 130B are mutually connected by optical transmission paths 61 and 62 and are each connected to the network management server 40 by the optical network.

The network management server 40 supplies information as to the transfer conditions (including a channel spacing and a bit rate) set in a client system to the transport equipment 130A and the transport equipment 130B. The bit rate may be set by a network operator based upon the performances of optical transceivers 30A and 30B provided in the transport equipments 130A and 130B, respectively, which serve as transmission/reception frontend nodes, the states of the optical transmission paths 61 and 62, a required transmission speed, etc.

The transport equipment 130A includes, for example, optical amplifiers 131 and 132, a multiplexer/demultiplexer (denoted as "MUX/DEMUX" in the figure) 133, and one or more transponders 50. The transponder 50 may have an optical transceiver 30 of an embodiment described above which serves as an E/O and O/E frontend circuit. The transport equipment 130B has the same configuration as the transport equipment 130A.

The optical transceivers 30A and 30B select a modulation scheme in accordance with the channel spacing and the bit rate contained in the transfer condition configuration information, and operate according to the selected modulation scheme. In other words, based upon the selected modulation scheme, electrical signals are converted into optical signals and output to the optical network, and optical signals received from the optical network are converted into electrical signals and data bits are determined.

Figure 15:
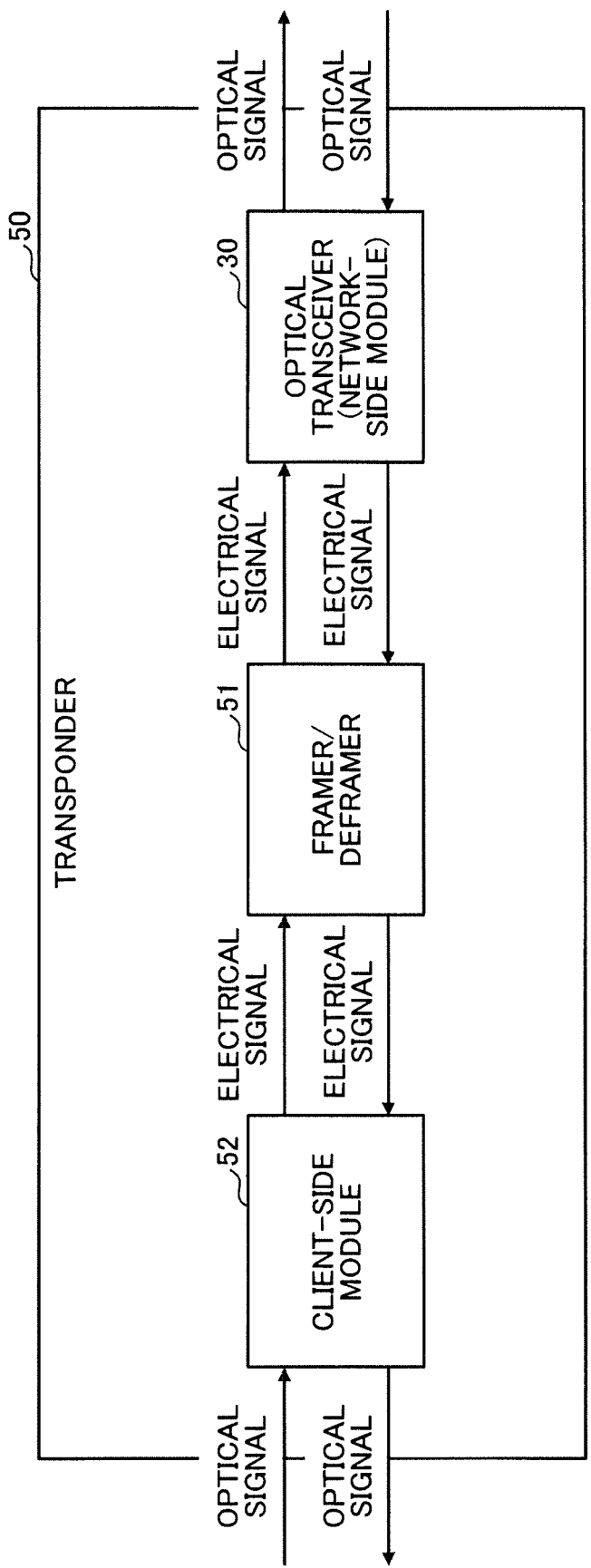
FIG. 15 is a schematic diagram of a transponder which is an example of an optical communication apparatus of an embodiment.

FIG. 15 is a schematic diagram of the transponder 50. The transponder 50 has an optical transceiver 30, a framer/deframer 51, and a client-side module 52. The optical transceiver 30 is one as described above with reference to FIG. 6 to FIG. 9, and operates at a modulation method selected adaptively in response to the transfer conditions.

The client-side module 52 serves as an interface to a client device, and it converts an optical signal input from a fiber optic Ethernet (registered trademark) cable into an electrical signal and supplies the electrical signal to the framer/deframer 51. In the reverse process, the client-side module 52 receives an electrical signal from the framer/deframer 51, converts the electric signal into an optical signal, and outputs the optical signal toward the client side.

The framer/deframer 51 converts the electric signal of the client-side format into a frame format of the OTN (Optical Transport Network) format and inputs the converted signal to the DSP of the optical transceiver 30. In the reverse process, the OTN electrical signal output from the DSP of the optical transceiver 30 is converted into an electrical signal of the client-side format, and supplied to the client side module 52.

Two or more transponders 50 may be incorporated, together with a wavelength multiplexer, a wavelength selective switch, or the like, into a wavelength division multiplexing (WDM) transport equipment. In this case, the optical transceiver 30 of each of the transponders 50 operates at the optimum modulation scheme in response to the channel spacing of an arrayed waveguide grating (AWG) used in the transport equipment and the bit rate set in the network. Data transfer quality is maintained satisfactorily, while suppressing increase of power consumption.

FIG. 16 is a schematic diagram illustrating a network management server 40 and an optical transceiver 30C used in an optical transport system 1 according to an embodiment. In this configuration, the network management server 40 determines a modulation scheme in response to the currently configured channel spacing and bit rate, and notifies the optical transceiver 30C of the determined modulation scheme.

The network management server 40 is formed of a processor and a memory, and it includes a transfer condition input part 41, a modulation scheme determination part 42, and a modulation scheme transmission part 43, and it has associated information 46. The associated information 46 describes a correspondence relation between bit rate and modulation scheme at each channel spacing.

The transfer condition input part 41 inputs transfer conditions such as a channel spacing and a bit rate input by, for example, a network operator. The modulation scheme determination part 42 refers to the associated information 46 to determine a modulation scheme in accordance with the channel spacing and the bit rate. The modulation scheme transmission part 43 transmits the determined modulation scheme as modulation scheme configuration information to the optical transceiver 30C.

The transfer condition input part 41 may be implemented by an input interface such as a keyboard, a mouse, a touch panel, or the like. The modulation scheme determination part 42 is implemented by a logic device such as an FPGA or a microprocessor. The associated information 46 may be saved in the memory. The modulation scheme transmission part 43 may be implemented by a network interface that provides a connection to the optical transceiver 30C in the network.

The modulation scheme receiving circuit 135 of the optical transceiver 30C receives the modulation scheme configuration information from the network management server 40 and supplies it to the DSP 35. The DSP 35 is configured with the modulation scheme and operates in this modulation scheme. The data signal to be transmitted is mapped on the constellation plane according to the modulation scheme to generate modulation signals. The DSP 35 also distributes the received signal detected by the PD23 onto the constellation plane and determines the signal constellation points according to the modulation scheme.

The operations of the light source 12, the optical modulator 13, the 90 degree optical hybrid circuit 22 and the photo detector (denoted as "PD" in the FIG. 23 of the optical transceiver 30C are the same as those explained with reference to FIG. 6 and FIG. 8, and redundant explanation will be omitted.

With this configuration, the optical transceiver 30C simply operates according to the designated modulation scheme, and it can maintain the data transport quality satisfactorily, while suppressing increase of power consumption.

Although the present invention has been described based upon particular embodiments, the present invention is not limited to these examples. The modulation scheme selector part 110 may be implemented by a DSP instead of an FPGA. The correspondence relation between bit rates and modulation schemes is not limited to the example of FIG. 5A, and it may be extended so as to include a bit rate of 100 Gbps and/or a bit rate over 600 Gbps. A channel spacing of 100 GHz may be added to the table, besides the 50 GHz and 75 GHz channel spacings. In this case, a higher threshold is selected for switching between modulation schemes. Besides, the bitrate threshold at each channel spacing used for selection of a modulation scheme may be provided from a network as a part of the transfer condition configuration information.

The modulation scheme adaptively selected by the optical communication apparatus or the server apparatus is not limited to QAM and 4D-mAnPSK schemes. Any type of a first modulation scheme with a sufficient distance between signal constellation points and with the amount of calculation for signal point determination not changing significantly in spite of increase in the degree of multilevel modulation, or any type of a second modulation scheme with a higher transfer performance may be used, depending on the bit rate on the network side. The second modulation scheme may need a calculation amount for signal point determination greater than the first modulation scheme At least one of the network management server 40 and the optical communication apparatus (such as the transponder 50, the optical transceiver 30, or the like) connected to the optical network may determine a modulation scheme in response to the currently configured bit rate. In this case, optical signals are transmitted and received between nodes according to the determined modulation scheme. The transfer condition receiving circuit 111 of the optical transmitter 10, the transfer condition receiving circuit 121 of the optical receiver 20, and the transfer condition receiving circuit 131 of the optical transceiver 30 may be implemented by an I/O interface or any other suitable input interface that can acquire information about transfer conditions including channel spacing and bit rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication apparatus comprising:
an interface circuit that acquires transfer condition information including a bit rate and a channel spacing of an optical network;
a processor that selects a modulation scheme in accordance with the transfer condition information, and operates in the modulation scheme,
wherein the processor is configured to select a first modulation scheme when the bit rate is greater than a first value in accordance with the channel spacing, and select a second modulation scheme when the bit rate is smaller than the first value, the second modulation scheme having a data transfer performance higher than the first modulation scheme,
wherein the processor selects a Quadrature Amplified Modulation (QAM) scheme when the bit rate is greater than the first value, and selects a 4-dimensional m-ary amplitude, n-ary phase shift keying (4D-mAnPSK) modulation scheme when the bit rate is smaller than the first value, and
wherein the processor selects a hybrid modulation scheme combining QAM and 4D-mAnPSK when the bit rate is equal to the first value.

2. The optical communication apparatus as claimed in claim 1, wherein a calculation amount for signal point determination of the second modulation scheme is greater than that of the first modulation scheme.

3. The optical communication apparatus as claimed in claim 1, wherein the first value increases as the channel spacing increases.

4. The optical communication apparatus as claimed in claim 1, wherein the interface circuit receives the transfer condition information from an optical network to which the optical communication apparatus is connected.

5. The optical communication apparatus as claimed in claim 1, further comprising:
a memory that saves associated information describing a correspondence relation between the bit rate and the modulation scheme at each of channel spacings,
wherein the processor refers to the associated information and selects the modulation scheme in accordance with the channel spacing and the bit rate contained in the transfer condition information.

6. The optical communication apparatus as claimed in claim 5,
wherein the associated information is described in a table format in which each of available bit rates is associated with a corresponding modulation scheme at each of the channel spacings.

7. The optical communication apparatus as claimed in claim 5,
wherein the associated information is described by a function that defines the correspondence relation between the bit rate and the modulation scheme at each of the channel spacings.

8. A server apparatus used in an optical network to which an optical communication apparatus is connected, comprising:
an input circuit that receives transfer condition configuration information including a bit rate and a channel spacing of an optical network,
a processor that selects a modulation scheme in accordance with a channel spacing and a bit rate indicated by the transfer condition configuration information, and
a transmitter that transmits the modulation scheme selected by the processor to the optical communication apparatus,
wherein the processor is configured to select a first modulation scheme when the bit rate is greater than a first value in accordance with the channel spacing, and select a second modulation scheme when the bit rate is smaller than the first value, the second modulation scheme having a data transfer performance higher than the first modulation scheme,
wherein the processor selects a Quadrature Amplified Modulation (QAM) scheme when the bit rate is greater than the first value, and selects a 4-dimensional m-ary amplitude, n-ary phase shift keying (4D-mAnPSK) modulation scheme when the bit rate is smaller than the first value, and
wherein the processor selects a hybrid modulation scheme combining QAM and 4D-mAnPSK when the bit rate is equal to the first value.

9. The server apparatus as claimed in claim 8, wherein a calculation amount for signal point determination of the second modulation scheme is greater than that of the first modulation scheme.

10. The server apparatus as claimed in claim 8, further comprising:
a memory that saves associated information describing a correspondence relation between the bit rate and the modulation scheme at each of channel spacings,
wherein the processor selects the modulation scheme by referring to the associated information.

11. An optical transport system comprising:
an optical communication apparatus connected to an optical network; and
a server apparatus that manages the optical network,
wherein at least one of the optical communication apparatus and the server apparatus determines a modulation scheme in accordance with a channel spacing and a bit rate provided for the optical communication apparatus, and wherein the modulation scheme is determined such that a first modulation scheme is selected when the bit rate is greater than a first value in accordance with the channel spacing, and that a second modulation scheme is selected when the bit rate is smaller than the first value, the second modulation scheme having a data transfer performance higher than the first modulation scheme, wherein a Quadrature Amplified Modulation (QAM) scheme is selected when the bit rate is greater than the first value, and a 4-dimensional m-ary amplitude, n-ary phase shift keying (4D-mAnPSK) modulation scheme is selected when the bit rate is smaller than the first value, and wherein a hybrid modulation scheme combining QAM and 4D-mAnPSK is selected when the bit rate is equal to the first value.

12. The optical transfer system as claimed in claim 11, wherein a calculation amount for signal point determination of the second modulation scheme is greater than the first modulation scheme.

13. The optical transport system as claimed in claim 11, wherein the modulation scheme is determined at the server apparatus, and the server apparatus notifies the optical communication apparatus of the modulation scheme.

14. The optical transport system as claimed in claim 11, wherein the server apparatus notifies the optical communication apparatus of the channel spacing and the bit rate, and the optical communication apparatus determines the modulation scheme based upon the channel spacing and the bit rate.

* * * * *